(12) United States Patent
Qian et al.

(10) Patent No.: US 10,007,060 B1
(45) Date of Patent: Jun. 26, 2018

(54) CONSTRUCTION OF INTEGRATED MODE TRANSFORMERS

(71) Applicant: Mellanox Technologies Silicon Photonics Inc., Monterey Park, CA (US)

(72) Inventors: Wei Qian, Torrance, CA (US); Monish Sharma, Artesia, CA (US)

(73) Assignee: Mellanox Technologies Silicon Photonics Inc., Monterey Park, CA (US)

( * ) Notice: Subject to any disclaimer, the term of this patent is extended or adjusted under 35 U.S.C. 154(b) by 0 days. days.

(21) Appl. No.: 15/714,448

(22) Filed: Sep. 25, 2017

(51) Int. Cl.
*G02B 6/26* (2006.01)
*G02B 6/122* (2006.01)
*G02B 6/136* (2006.01)
*G02B 6/12* (2006.01)
*G02B 6/30* (2006.01)
*G02B 6/138* (2006.01)

(52) U.S. Cl.
CPC ....... *G02B 6/1228* (2013.01); *G02B 6/12007* (2013.01); *G02B 6/136* (2013.01); *G02B 6/138* (2013.01); *G02B 6/305* (2013.01); *G02B 2006/12069* (2013.01); *G02B 2006/12097* (2013.01)

(58) Field of Classification Search
CPC ...... G02B 6/1228; G02B 6/138; G02B 6/136; G02B 6/305; G02B 6/12007; G02B 2006/12097; G02B 2006/12069
See application file for complete search history.

(56) References Cited

U.S. PATENT DOCUMENTS

| | | | |
|---|---|---|---|
| 7,005,247 B1 * | 2/2006 | Fong | G02B 6/12011 216/24 |
| 9,036,969 B2 * | 5/2015 | Kwon | G02B 6/1228 385/28 |
| 2012/0076465 A1 * | 3/2012 | Chen | G02B 6/1228 385/124 |
| 2015/0043867 A1 * | 2/2015 | Kono | G02F 1/2257 385/3 |

* cited by examiner

*Primary Examiner* — Ellen Kim
(74) *Attorney, Agent, or Firm* — Gavrilovich, Dodd & Lindsey, LLP

(57) ABSTRACT

Fabricating the mode transformer includes forming a cladding trench in a first light-transmitting medium that is included on a wafer. A lateral cladding is formed in the cladding trench such that the lateral cladding becomes an optical cladding on a lateral side of a first tapered portion of a waveguide. A second light-transmitting medium is formed on the wafer such that a portion of the first light-transmitting medium is between a bottom of the trench and the second light-transmitting medium. The second light-transmitting medium is patterned so as to define a second tapered portion of the waveguide over the first tapered portion of the waveguide.

18 Claims, 9 Drawing Sheets

CONSTRUCTION OF INTEGRATED MODE TRANSFORMERS

RELATED APPLICATIONS

This patent application is related to U.S. patent application Ser. No. 15/382,481; filed on Dec. 16, 2016; and entitled "Construction of Integrated Mode Transformers" and to U.S. patent application Ser. No. 15/585,705; filed on May 3, 2017; and entitled "Construction of Integrated Mode Transformers;" each of which is incorporated herein in its entirety.

FIELD

The present invention relates to optical devices and more particularly to optical devices that include a mode transformer.

BACKGROUND

A variety of optical devices have one or more waveguides positioned on base. The waveguides often guide light signals to other optical components such as modulators, switches, demultiplexers, and light sensors. These waveguides often receive the light signals from an external device and/or guide the light signals to the external optical device. Accordingly, the light signals are often transferred between a waveguide on the optical device and an external optical device such as an optical fiber or laser.

The mode size for the waveguide is often different than mode size of the external optical device. For instance, the mode size of waveguides on planar optical devices is often smaller than the mode size of the optical fibers with which the planar optical device exchanges light signals. The difference in mode size is a source of optical loss that may limit device performance. In order to address this issue, a taper is often added to the waveguide that exchanges light signals with the external optical device. For instance, the waveguide on a planar optical device can be tapered such that the mode size of a light signal carried in the waveguide expands to the mode size of the optical fiber with which the waveguide will exchange light signals.

It is often desirable for these tapers to be inverted such that the bottom of the taper is located below the bottom of an untapered portion of the waveguide. In this configuration, the top of the taper can be flush with the top of the untapered portion of the waveguide to provide the optical device with a continuous and smooth upper surface for the fabrication of other optical components. As a result, fabrication of these tapers typically includes etching downward through a light-transmitting medium to a layer of material that serves as a cladding for the taper. However, this etch generally produces mushrooming at the interface of the light-transmitting medium and underlying the cladding. This mushrooming reduces the ability to control the shape of the taper. As a result, there is a need for an improved taper fabrication techniques and/or structures.

SUMMARY

Fabricating an optical device with an integrated mode taper can include forming a cladding trench in a first light-transmitting medium that is included on a wafer. A lateral cladding is formed in the cladding trench such that the lateral cladding becomes an optical cladding on a lateral side of a first tapered portion of a waveguide. A second light-transmitting medium is formed on the wafer such that a portion of the first light-transmitting medium is between a bottom of the trench and the second light-transmitting medium. The second light-transmitting medium is patterned so as to define a second tapered portion of the waveguide over the first tapered portion of the waveguide.

Additionally or alternately, fabricating an optical device with an integrated mode transformer includes forming a lateral cladding on a lateral side of a first tapered portion of a waveguide. A lower waveguide cladding is formed on a bottom of the first tapered portion. The lower waveguide cladding is formed concurrently with or after the lateral cladding is formed. A second tapered portion of the waveguide is formed such that the first tapered portion is between the lower waveguide cladding and the second tapered portion. The second tapered portion is stacked on the first tapered portion such that the first tapered portion and the second tapered portion are included in a waveguide taper. The second tapered portion is formed after the lower waveguide cladding is formed.

such that the stacked on the first tapered portion and such that the first tapered portion is between the lower waveguide cladding and the second tapered portion, the second tapered portion being formed after the lower waveguide cladding is formed, and the first tapered portion and the second tapered portion being included in a waveguide taper.

BRIEF DESCRIPTION OF THE FIGURES

FIG. 2A is a perspective view of the optical device.

FIG. 2B is a cross section of the optical device shown in FIG. 2A taken along the line labeled B in FIG. 2A.

FIG. 2C is a cross section of the optical device shown in FIG. 2A taken along the line labeled C in FIG. 2A.

FIG. 2D is a perspective view of the optical device shown in FIG. 2A but with a portion of the device treated as transparent so the relationship between underlying features is visible.

FIG. 3A is a perspective view of a device precursor upon which a first mask has been patterned and the result etched so as to form cladding trenches.

FIG. 3B is a perspective view of the device precursor of FIG. 3A after optical claddings are formed in the cladding trenches and on an upper surface of the device precursor.

FIG. 3C is a perspective view of the device precursor of FIG. 3B after the device precursor is inverted and a substrate attached to the bottom of the result.

FIG. 3D is a perspective view of the device precursor after removal of one or more sacrificial layers from the device precursor of FIG. 3C.

FIG. 3E is a perspective view of the device precursor of FIG. 3D after formation of a second mask on the device precursor and embedding of another optical cladding within the device precursor.

FIG. 3F is a perspective view of the device precursor after addition of light-transmitting medium to the device precursor of FIG. 3E.

FIG. 3G is a perspective view of the device precursor of FIG. 3F after patterning a third mask on the upper surface of the device precursor of FIG. 3F. The third mask is patterned so as to define a waveguide and waveguide taper on the device precursor.

FIG. 3H is a perspective view of the device precursor of FIG. 3G after etching the device precursor of FIG. 3G so as to form a waveguide and waveguide taper on the device precursor.

FIG. 3I illustrates a cladding layer formed on and/or over the device precursor of FIG. 3H.

DESCRIPTION

A wafer that includes a first light-transmitting medium on one or more sacrificial layers can be used to fabricate an optical device having a mode transformer that guides light signals through the first light-transmitting medium. During fabrication, a cladding trench is etched into the first light-transmitting medium. A lateral cladding is formed in the resulting cladding trench. Additionally, a lower taper cladding can be formed on the top of the first light-transmitting medium and between different regions of the lateral cladding. The remainder of the optical device fabrication can be performed so the lateral cladding serves as an optical cladding on a lateral side of the mode transformer and the lower taper cladding serves as an optical cladding on the bottom of the mode transformer.

During fabrication of the optical device, the cladding trench need not extend through the first light-transmitting medium. For instance, the bottom of the cladding trench can be spaced apart from any materials under the first light-transmitting medium. Accordingly, mushrooming does not occur at the interface between the light-transmitting medium and any underlying material(s). Further, the first light-transmitting medium that remains between the bottom of the cladding trench and the underlying material(s) can be used as a seed layer for growing additional light-transmitting medium on the wafer. The ability to use growth technologies to form the additional light-transmitting medium on the first light-transmitting medium provides a high quality interface between the first light-transmitting medium and the additional light-transmitting medium. Accordingly, the first light-transmitting medium and the additional light-transmitting medium combine to provide a single continuous layer of the light-transmitting medium with a smooth upper surface. Additional device features can be formed in this layer of the light-transmitting medium. Examples of the additional features include, but are not limited to, waveguides, upper level features of the mode transformer, and/or additional optical components. Accordingly, the method eliminates the problems associated with mushrooming and provides a layer of a light-transmitting medium that is suitable for additional device fabrication.

Figure 1:
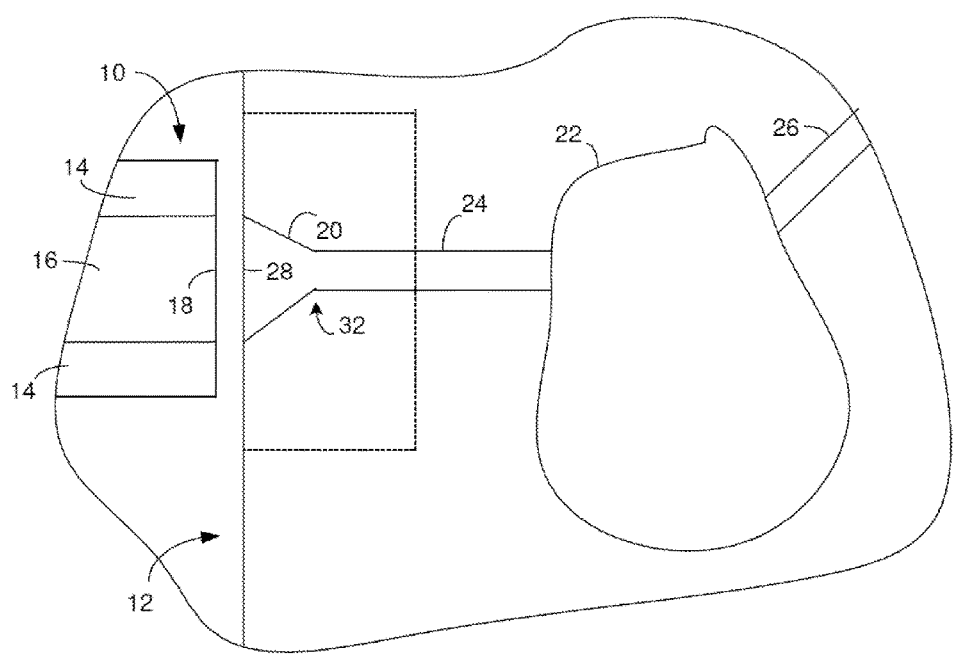
FIG. 1 is a perspective view of a system that includes an optical fiber in communication with an optical device.

FIG. 1 illustrates a system that includes an optical fiber 10 in communication with an optical device 12. In FIG. 1, a cross section of the optical fiber 10 is shown and a topview of the optical device 12 is shown. The optical fiber 10 includes a cladding 14 on a core 16. The core 16 includes a fiber facet 18 through which light signals exit and/or enter the optical fiber 10.

The illustrated portion of the optical device 12 includes a taper 20, an optical component 22, a waveguide 24 and a secondary waveguide 26. The taper 20 includes a taper facet 28. The dimensions of the taper facet 28 can be single mode or multimode. The waveguide 24 guides light signals between the taper 20 and the optical component 22. The light signals travel through the taper 20 when traveling between the optical fiber 10 and the waveguide 24. The taper 20 can change the size and/or shape of the one or more optical modes of the light signals as they travel though the taper 20. For instance, when the light signals travel from the optical fiber 10 to the optical device 12, the taper 20 can reduce the size and/or shape of the light signal to a size and/or shape that is suitable for the smaller dimensions of the waveguide 24. In some instances, the taper 20 acts as a mode transformer. In some instances, the taper 20 can be configured as an adiabatic mode transformer.

The secondary waveguide 26 is optional and can carry light signals to and/or from the optical component 22. Examples of optical components 22 that can be included on the optical device 12 include, but are not limited to, one or more components selected from a group consisting of facets through which light signals can enter and/or exit a waveguide, entry/exit ports through which light signals can enter and/or exit a waveguide from above or below the optical device 12, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, modulators that convert a light signal to an electrical signal, and vias that provide an optical pathway for a light signal traveling through the optical device 12 from the bottom side of the optical device 12 to the top side of the optical device 12. Additionally, the optical device 12 can optionally include electrical components. For instance, the optical device 12 can include electrical connections for applying a potential or current to a waveguide and/or for controlling other components on the optical device 12.

Figure 2A:
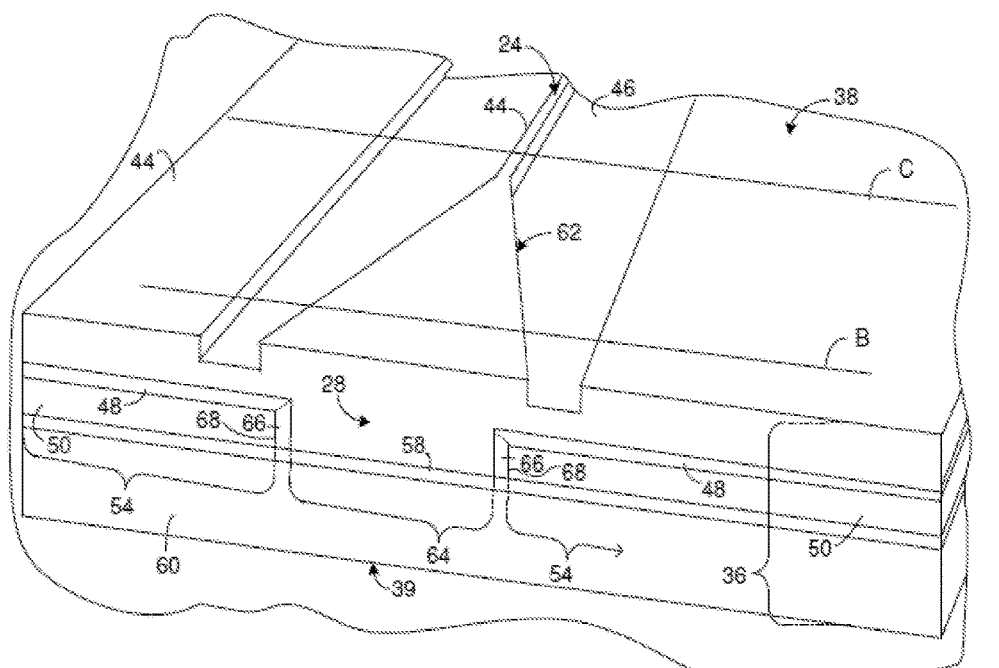
FIG. 2A through FIG. 2D illustrate an optical device that is suitable for use as an optical device in the system of FIG. 1.
Figure 2B:
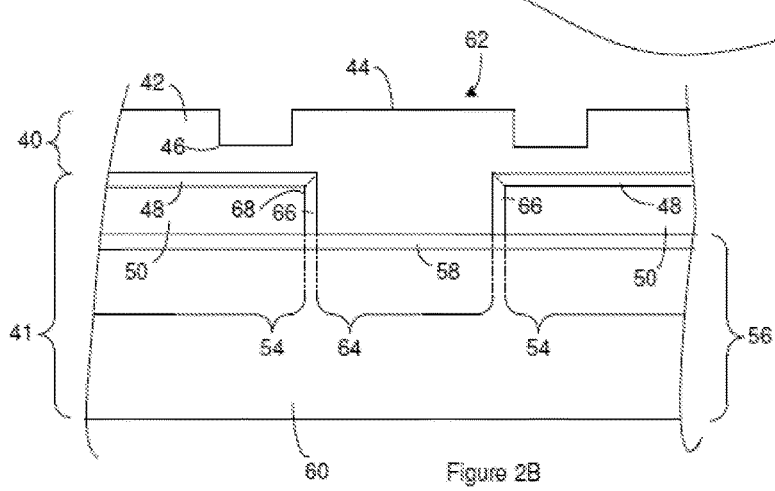
Figure 2C:
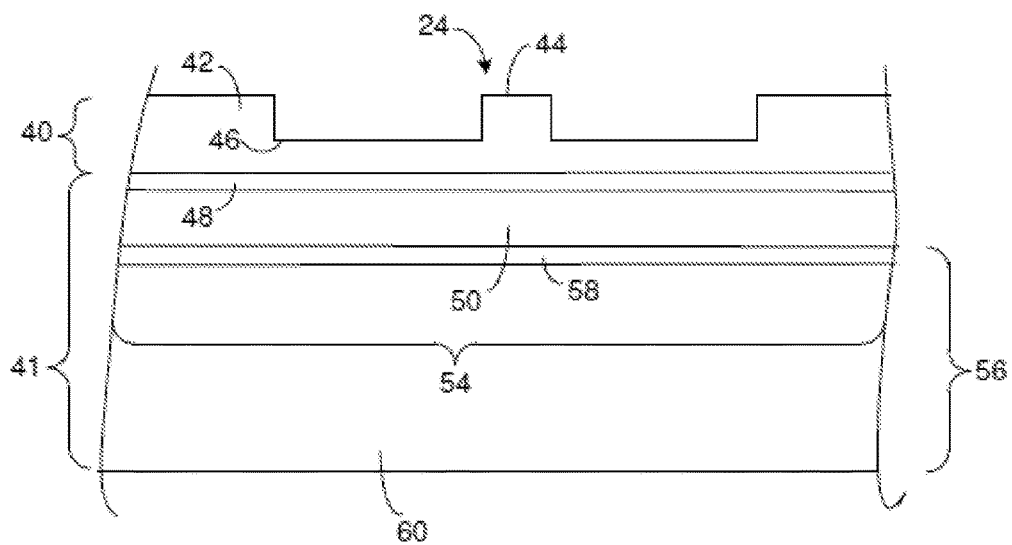
Figure 2D:
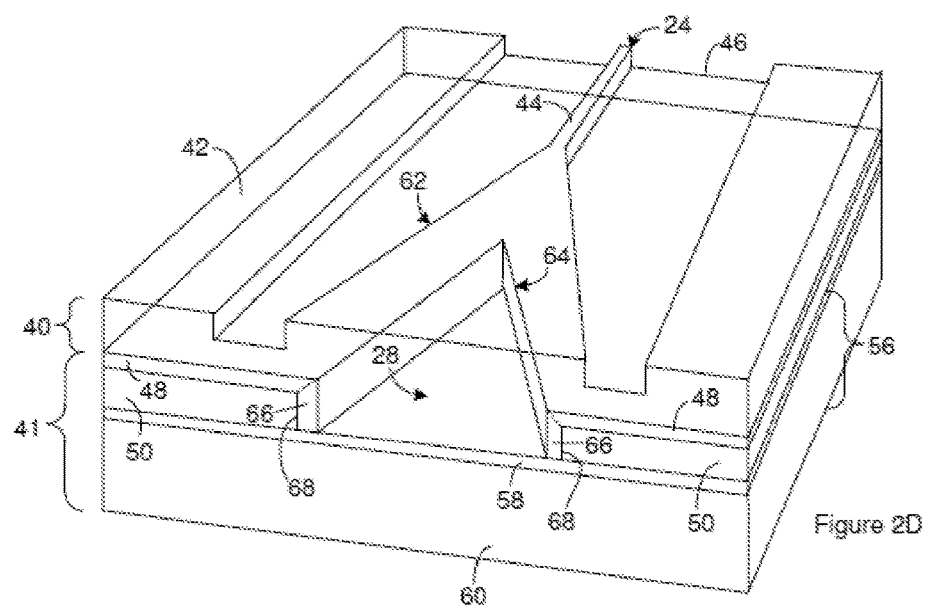

FIG. 2A through FIG. 2D illustrate an optical device that is suitable for use as an optical device 12 in the system of FIG. 1. FIG. 2A is a perspective view of the optical device. FIG. 2B is a cross section of the optical device shown in FIG. 2A taken along the line labeled B in FIG. 2A. FIG. 2C is a cross section of the optical device shown in FIG. 2A taken along the line labeled C in FIG. 2A. FIG. 2D is the perspective view of the optical device shown in FIG. 2A but with a portion of the device treated as transparent so the relationship between underlying features is visible.

The optical device is within the class of optical devices known as planar optical devices. Planar optical devices typically include one or more waveguides immobilized relative to a substrate or a base. The direction of propagation of light signals along the waveguides is generally parallel to a horizontal plane of the optical device. Examples of a horizontal plane of the optical device include the topside of the base, the bottom side of the base, the topside of the substrate, and/or the bottom side of the substrate.

The illustrated optical device includes lateral sides 36 (or edges) extending from a topside 38 to a bottom side 39. The propagation direction of light signals along the length of the waveguides on a planar optical device generally extends through the lateral sides 36 of the optical device. The topside 38 and the bottom side 39 of the optical device are non-lateral sides.

The optical device includes a waveguide layer 40 on a device platform 41. In FIG. 2D, the waveguide layer 40 is treated as transparent in order to show the underlying parts of the device. The device platform 41 is a platform upon which planar optical devices are typically built. Examples of device platforms 41 include, but are not limited to, optical chips and optical wafers such as silicon-on-insulator wafers, and silicon-on-insulator chips. Since multiple optical devices are typically built on a single wafer and the separated from one another, the device platform 41 can be a chip or a portion of a wafer.

The waveguide layer 40 includes or consists of a light-transmitting medium 42. The waveguide layer 40 includes a waveguide 24 that is configured to guide light signals through the light-transmitting medium 42. Accordingly, the light-transmitting medium 42 can serve as the waveguide material. A portion of the waveguide 24 is partially defined by a ridge 44 extending upward from a slab region of the light-transmitting medium 42 as is most evident in FIG. 2C. In some instances, the top of the slab region is defined by the bottom of trenches 46 extending partially into the light-transmitting medium 42 or through the light-transmitting medium 42. Suitable light-transmitting media include, but are not limited to, silicon, polymers, silica, SiN, GaAs, InP and LiNbO$_3$. One or more cladding layers (not shown) are optionally positioned on the light-transmitting medium 42. The one or more cladding layers can serve as a cladding for the waveguide and/or for the optical device. When the light-transmitting medium 42 is silicon, suitable cladding layers include, but are not limited to, silicon, polymers, silica, SiN, GaAs, InP and LiNbO$_3$.

The portion of the device platform 41 adjacent to the light-transmitting medium 42 can act as a cladding for the waveguide 24. For instance, a portion of the device platform 41 can be in contact with the bottom of the light-transmitting medium 42 and can be configured to reflect light signals from the waveguide 24 back into the waveguide 24 in order to constrain light signals in the waveguide 24. For instance, the portion of the device platform 41 adjacent to the light-transmitting medium 42 can be a lower waveguide cladding 48 with a lower index of refraction than the light-transmitting medium 42. The drop in the index of refraction can cause reflection of a light signal from the light-transmitting medium 42 back into the light-transmitting medium 42.

The device platform 41 can include an intermediate medium 50 positioned such that at least a portion of the lower waveguide cladding 48 is between the intermediate medium 50 and the light-transmitting medium 42. In some instances, the lower waveguide cladding 48 is in direct contact with the intermediate medium 50. In the portion of the optical device shown in FIG. 2D, light signals are not substantially carried or substantially guided through the intermediate medium 50 during operation of the device. The light-transmitting medium 42 and the intermediate medium 50 can be the same material or different materials. In some instances, the light-transmitting medium 42 and the intermediate medium 50 are silicon.

The intermediate medium 50 is positioned on a base 56. The base 56 can include a lower taper claddings 58 positioned on a substrate 60. In some instances, the lower taper cladding 58 is in direct contact with the intermediate medium 50. The lower taper claddings 58 can have a lower index of refraction than the light-transmitting medium 42. The lower taper claddings 58 can be the same material or a different material from the lower waveguide cladding 48.

In one example, the device platform 41 has the structure of a silicon-on-insulator wafer. A silicon-on-insulator wafer includes a silicon layer that serves as the intermediate medium 50. The silicon-on-insulator wafer also includes a layer of silica positioned on a silicon substrate. The layer of silica can serve as the lower taper claddings 58 and the silicon substrate can serve as the substrate 60.

Figure 2E:
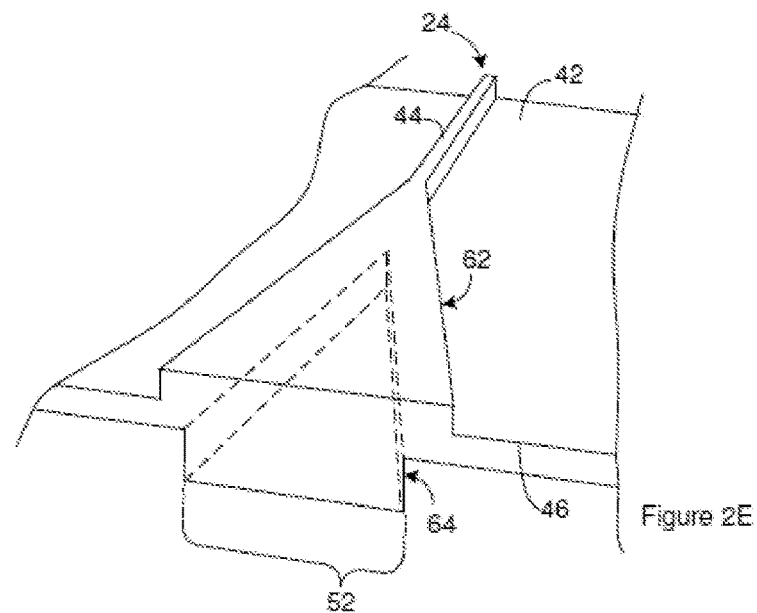
FIG. 2E shows a taper and a waveguide separated from the other components on the device shown in FIG. 2A and FIG. 2D.

A portion of the ridge of light-transmitting medium 42 is tapered. As discussed above, FIG. 2D treats the waveguide layer 40 as transparent. As a result, the interior features of the waveguide taper 20 are shown in FIG. 2D. FIG. 2E shows the taper 20 and waveguide 24 separated from the other components on the device.

The taper 20 includes multiple stacked taper structures that combine to form a taper that is suitable for serving as the taper 20 of FIG. 1. The illustrated taper 20 includes a waveguide taper 62 stacked on a platform taper 64 such that the combination forms the taper. Although two taper structures are illustrated, the taper can include a different number of taper structures. The waveguide taper 62 and the platform taper 64 can have one or two features selected from a group consisting of a horizontal taper and a lateral taper. As a result, the taper can be horizontally and/or vertically tapered. The illustrated waveguide taper 62 has a horizontal taper but does not have a vertical taper. The illustrated platform taper 64 has a horizontal taper but does not have a vertical taper. The tapers in different taper structures can be different as is most evident from FIG. 2D. For instance, FIG. 2D shows the platform taper having a faster taper rate than the waveguide taper 62. Additional examples of taper differences that can be evident in adjacent taper structures include, but are not limited to, different shapes such as straight and curved. The different taper structures in a taper can be constructed such that the combination of taper structures provided the taper with one or more features that are not present in any of the individual taper structures. For instance, the taper structures shown in FIG. 2A through FIG. 2E are constructed such that the taper has a vertical taper even though none of the taper structures is vertically tapered. In some instances, the taper structures are selected so as to provide the taper with an adiabatic taper.

The light-transmitting medium 42 included in the waveguide taper 62 includes an upper facet surface and the light-transmitting medium 42 included in the platform taper 64 includes a lower facet surface. The upper facet surface and the lower facet surface combine to form the taper facet 28. The taper structures are selected to provide a taper facet 28 that is suitably sized for alignment with the core 16 of the optical fiber.

FIG. 2A through FIG. 2D show the platform taper 64 positioned within the footprint of the waveguide taper 62. In this arrangement, the light-transmitting medium 42 included in the waveguide taper 62 includes a shelf 65 that extends past the lateral sides of the platform taper 64. The shelf 65 can be positioned on the lower waveguide cladding 48. In some instances, the shelf 65 is in contact with the lower waveguide cladding 48. As a result, the lower waveguide cladding 48 can prevent optical loss from the bottom of the waveguide taper 62. In the illustrated arrangement, the taper is butt-coupled with the waveguide 24 rather than having one or more taper structures that push the lights signal into the waveguide from above or below the waveguide 24. Butt coupling between the taper and the waveguide 24 provides a more efficient transfer of optical energy between the taper and the waveguide 24. However, the taper can have other structures. For instance, the platform taper 64 can extend past the waveguide taper 62 and under the waveguide 24 and/or the waveguide taper 62 can be positioned within the footprint of the platform taper 64.

As is most evident from FIG. 2C and FIG. 2D, lateral cladding 66 are located in a recess 68 in the light-transmitting medium 42 and are located on the lateral sides of the platform taper 64. In some instances, the lateral cladding(s) 66 are perpendicular or substantially perpendicular to the base 56. The lower taper claddings 58 can contact the lateral cladding 66 and/or be positioned between different regions of the lateral cladding 66. In some instances, the lower taper cladding 58 spans a gap between different regions of the lateral cladding 66. The lateral cladding 66 and the lower taper claddings 58 can act as a cladding for the platform taper 64. For instance, the lower taper claddings 58 and the lateral cladding 66 can be configured to reflect light signals from the platform taper 64 back into the platform taper 64 in order to constrain light signals in the platform taper 64. For instance, lateral cladding 66 and the lower taper claddings 58 can contact the light-transmitting medium 42 in the platform taper 64 and can each have a lower index of refraction than the light-transmitting medium 42. The drop in the index of refraction can cause reflection of a light signal from the intermediate medium 50 back into the intermediate medium 50. In some instances, the lateral cladding 66 and the lower taper claddings 58 are the same material. In some instances, the lower waveguide cladding 48, the lateral cladding 66 and the lower taper claddings 58 are the same material. In one example, the lateral cladding 66 and the lower taper claddings 58 are each silica and the light-transmitting medium 42 is silicon.

Figure 3A:
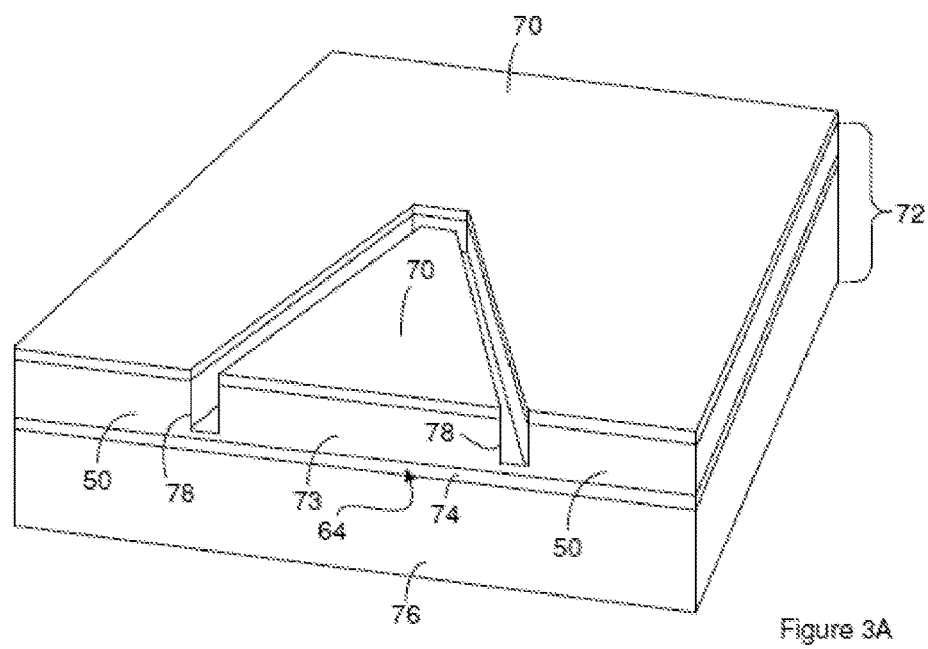
FIG. 3A through FIG. 3I illustrate a method of forming an optical device having an integrated taper according to FIG. 1A through FIG. 2E.

FIG. 3A through FIG. 3I illustrate a method of forming an optical device having an integrated taper according to FIG. 1A through FIG. 2E. FIG. 3A is a perspective view of a device precursor where the platform taper will be fabricated. The illustrated device precursor includes a first mask 70 on a wafer 72. The wafer includes a first light-transmitting medium 73 on one or more sacrificial layers. The one or more sacrificial layers are present in the wafer but are removed during fabrication and not present in the final optical device. When the wafer includes more than one sacrificial layer, the sacrificial layers can combine to form a sacrificial base for the wafer. The illustrated wafer includes a first light-transmitting medium 73 on a sacrificial layer 74 and a sacrificial substrate 76. The sacrificial layer 74 and sacrificial substrate 76 combine to form a sacrificial base for the wafer. The illustrated portion of the wafer 72 can be a portion of a silicon-on-insulator wafer or chip. Accordingly, the sacrificial layer 74 can be a silica insulator or silica optical cladding between silicon layers that serve as the sacrificial substrate 76 and first light-transmitting medium 73.

The first mask 70 is formed on the first light-transmitting medium 73. The first mask 70 is patterned so the first mask 70 protects the regions of the device precursor where the platform taper and the intermediate medium will be formed. Additionally, the first mask 70 is patterned such that regions of the first light-transmitting medium 73 where the lateral claddings are to be formed remain exposed. Accordingly, the pattern of the first mask 70 can substantially match the pattern that is desired for the lateral cladding(s). As will become evident below, the first mask 70 will define the platform taper 64. Accordingly, the first mask 70 is patterned so as to provide the platform taper 64 with the desired geometry. A suitable first mask 70 includes, but is not limited to, a hard mask such as silica, polymers and SiN and silicon oxynitride.

A first etch is performed so as to form the device precursor of FIG. 3A. The first etch can etch from a first side of the first light-transmitting medium toward a second side of the first light-transmitting medium and be stopped before or after reaching the second side of the first light-transmitting medium. As a result, the first etch can form one or more cladding trenches 78 that extend through the first light-transmitting medium or that do not extend to the sacrificial layer 74. However, forming the one or more cladding trenches 78 so the bottom of the one or more cladding trenches 78 is spaced apart from the sacrificial layer 74 as shown in FIG. 3A prevents mushrooming of the cladding trenches 78 at the sacrificial layer 74. Further, as will become evident below, the portion of the first light-transmitting medium 73 between the bottom of the one or more cladding trenches 78 and the sacrificial layer 74 can serve as a seed layer for growth of additional light-transmitting medium. Suitable first etches include, but are not limited to, a dry etch.

Figure 3B:
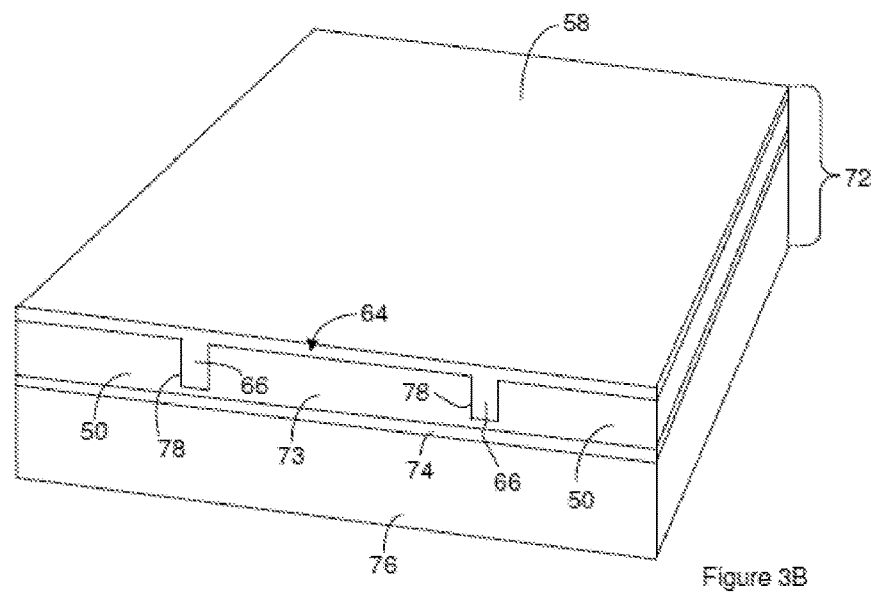

The first mask 70 is removed and the lateral cladding 66 formed in the cladding trenches 78 as shown in FIG. 3B. Forming the lateral cladding 66 in the cladding trenches 78 can be performed so as to concurrently form the lower taper claddings 58 on an upper surface of the first light-transmitting medium 73. Rather than forming the lateral cladding 66 concurrently with the lower taper cladding 58, the lateral cladding 66 and the lower taper cladding 58 can be formed sequentially. For instance, the lower taper cladding 58 can be deposited on the upper surface of the first light-transmitting medium 73 after the lateral cladding 66 formed in the cladding trenches 78.

A suitable method of forming the lateral cladding 66 in the cladding trenches 78 and/or the lower taper claddings 58 on an upper surface of the first light-transmitting medium 73 includes, but is not limited to, a thermal oxide process where the device precursor is heated in the presence of oxygen. When the first light-transmitting medium 73 is silicon and a thermal oxide process is performed, exposed silicon reacts with oxygen to form silicon dioxide that can act as the lateral cladding 66 and the lower taper claddings 58. The resulting oxide occupies more volume than the portion of the first light-transmitting medium 73 that was converted to the oxide. As a result, the cladding trenches 78 can be formed with a width that results in filling of the cladding trenches 78 with oxide during the thermal oxide treatment.

Figure 3C:
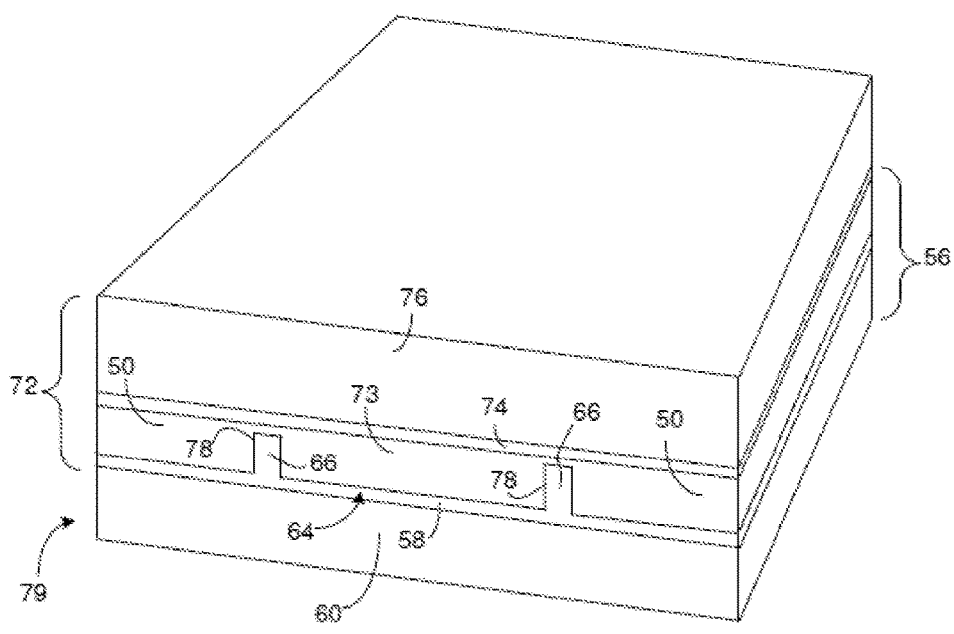

The lower taper cladding(s) 58 can be attached to a second wafer 79 that includes or consists of the substrate 60 and the result inverted so as to provide the device precursor of FIG. 3C. In some instances, the second wafer 79 is attached to the device precursor so the substrate 60 contacts the lower taper claddings 58 as shown in FIG. 3C. Additionally, the addition of the substrate 60 to the device precursor can form the base 41 of the optical device as shown in FIG. 3C. Suitable methods of attaching the second wafer 79 and the device precursor include, but are not limited to, direct bonding, plasma activated bonding, and surface activated bonding. Since two flat surfaces are being attached, wafer-bonding techniques provides high quality bonding results. Suitable second wafers for attaching to the lower taper claddings 58 include, but are not limited to, silicon wafers. Although the second wafer 79 in FIG. 3C is shown as having a single layer of material, the second wafer can include more than one layer of material.

Figure 3D:
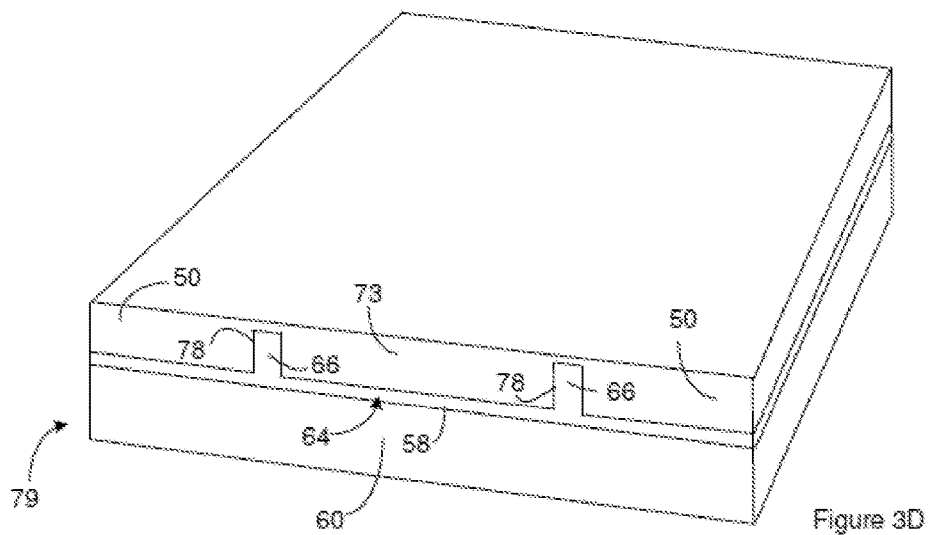

The sacrificial layer 74 and the sacrificial substrate 76 are removed from the device precursor of FIG. 3C so as to provide the device precursor of FIG. 3D. Suitable methods for removing the sacrificial substrate 76 include, but are not limited to, grinding and polishing. The method for removing the sacrificial substrate 76 can be stopped at the sacrificial layer 74. As a result, all or a portion of the sacrificial layer 74 can be present on the device precursor after removing the sacrificial substrate 76.

Suitable methods for removing the sacrificial layer 74 include, but are not limited to, wet etching and dry etching. Techniques for removing the sacrificial layer 74 such as etching can be selected such that the lower taper claddings 58 acts as an etch stop. Additionally or alternately, techniques such as etching can leave a smooth surface of the first light-transmitting medium 73 as the upper surface of the device precursor.

Figure 3E:
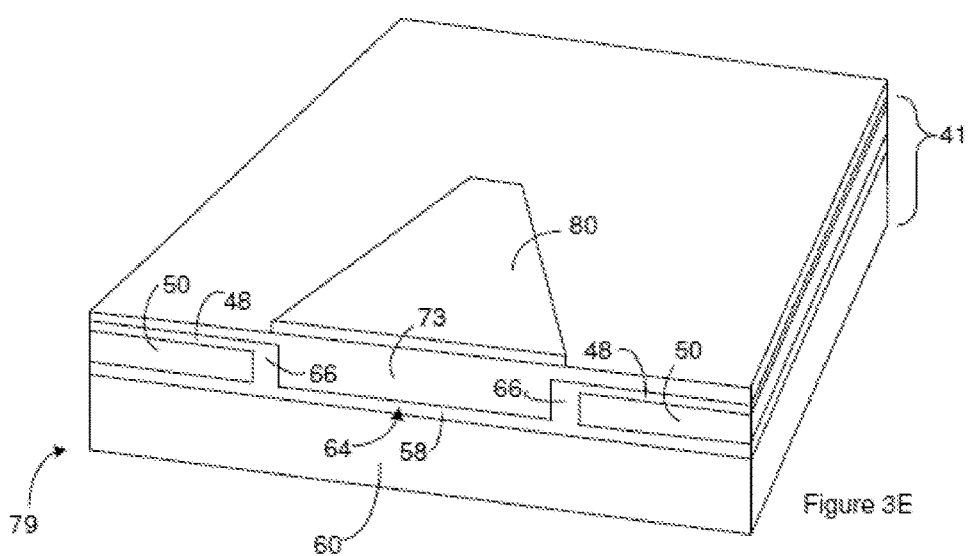

As shown in FIG. 3E, a second mask 80 is formed on the device precursor of FIG. 3D. The second mask 80 is formed on the upper surface of the device precursor and over the location where the platform taper 64 will be formed. The second mask 80 can also fully or partially overlap the lateral cladding 66. The one or more lower waveguide claddings 48 are then formed in the first light-transmitting medium 73 so as to provide the device precursor of FIG. 3E. As shown in FIG. 3E the one or more lower waveguide claddings 48 can contact the lateral cladding 66. The one or more lower waveguide claddings 48 are formed such that a layer of the first light-transmitting medium 73 is positioned over the one or more lower waveguide claddings 48. Accordingly, the one or more lower waveguide claddings 48 can be between different regions of the first light-transmitting medium 73. During formation of the one or more lower waveguide claddings 48, the second mask 80 can reduce or prevent formation of the lower waveguide cladding 48 within the platform taper 64. A suitable first mask 70 includes, but is not limited to, a hard mask such as silica, SiN, polymers, and silicon oxynitride.

A suitable method for forming the one or more lower waveguide claddings 48 includes, but is not limited to, implantation processes such as oxygen implantation. An example of suitable oxygen implantation processes include, but are not limited to, the separation by implantation of oxygen process (SIMOX). When the first light-transmitting medium 73 is silicon, the implanted oxygen is converted to silicon oxide by a high temperature annealing process. As a result, the implantation forms one or more silica lower waveguide claddings 48 in the device precursor.

The second mask 80 is removed from the device precursor of FIG. 3E. A second light-transmitting medium 86 can optionally be formed on the first light-transmitting medium 73 of FIG. 3E so as to provide the device precursor of FIG. 3F. FIG. 3E shows the second light-transmitting medium formed on the wafer such that a portion of the first light-transmitting medium is between a bottom of the cladding trench and the second light-transmitting medium. The second light-transmitting medium 86 and the first light-transmitting medium 73 serve as the light-transmitting medium 42. Accordingly, the second light-transmitting medium 86 can be formed on the first light-transmitting medium 73 so as to form a waveguide layer with the desired thickness. The second light-transmitting medium 86 and the first light-transmitting medium 73 can be the same material or different materials. In some instances, the second light-transmitting medium 86 and the first light-transmitting medium 73 are silicon.

Figure 3F:
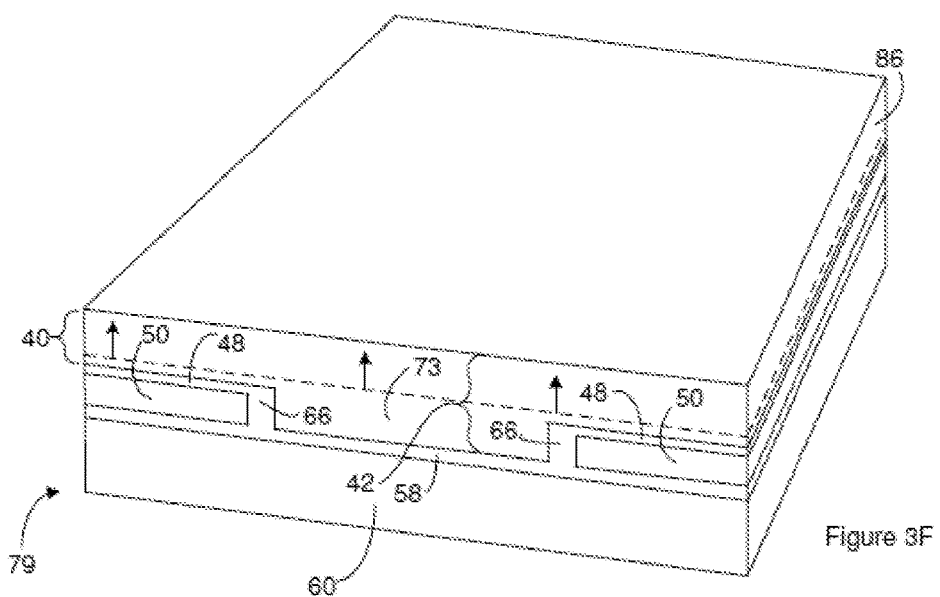
Figure 3G:
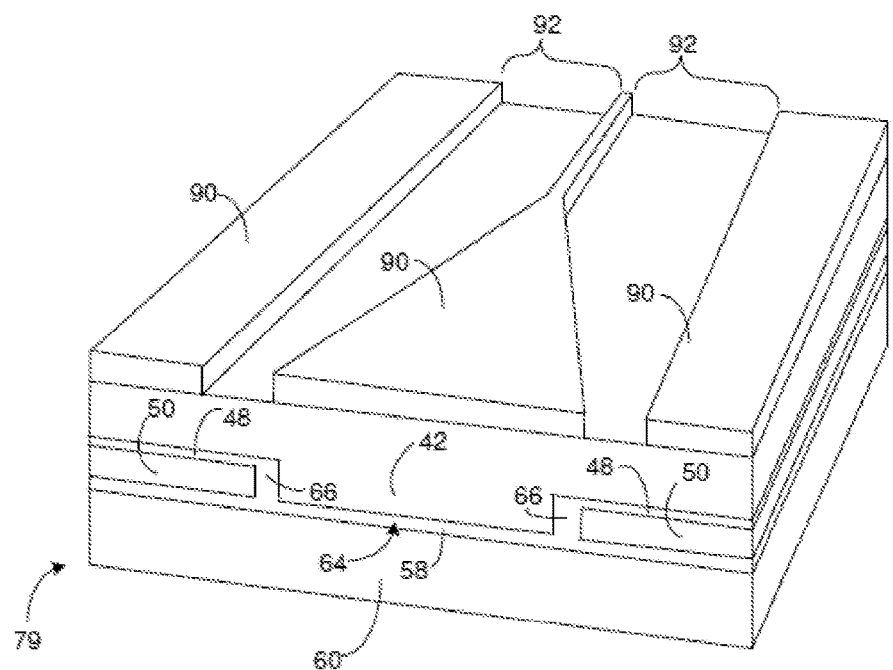
Figure 3H:
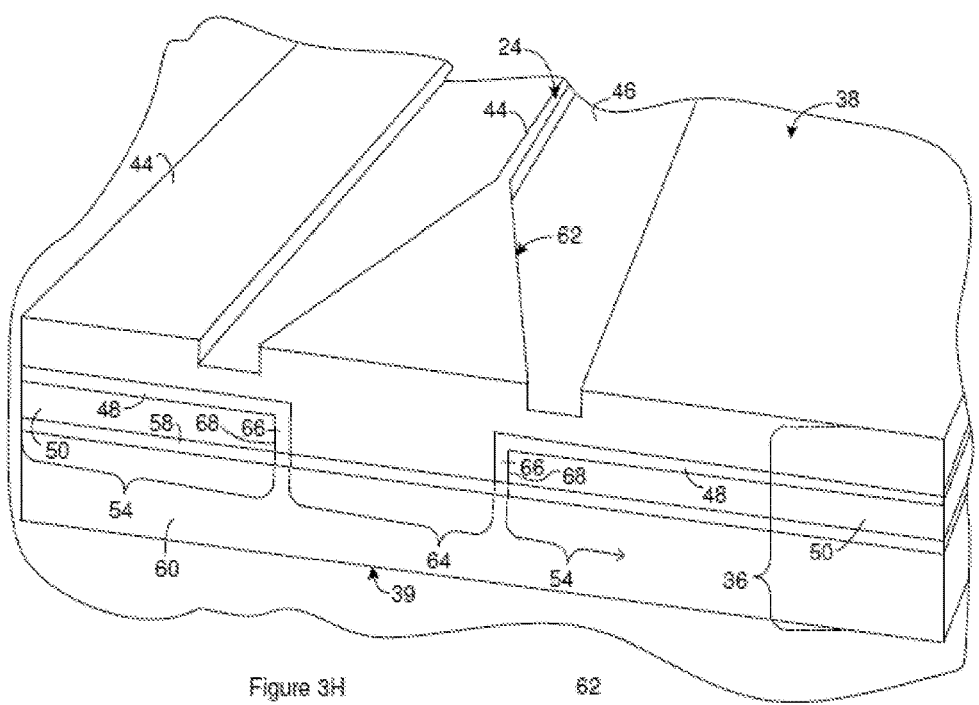

Suitable methods of forming the second light-transmitting medium 86 on the first light-transmitting medium 73 include, but are not limited to, growing the second light-transmitting medium 86 on the first light-transmitting medium 73 as indicated by the arrows in FIG. 3F. Suitable methods for growing the second light-transmitting medium 86 on the first light-transmitting medium 73 include, growth techniques that can use the upper surface of the first light-transmitting medium 73 as a seed layer such as epitaxial growth techniques. When the second light-transmitting medium 86 and the first light-transmitting medium 73 are the same material, epitaxial growth can provide result a high quality interface between the second light-transmitting medium 86 and the first light-transmitting medium 73.

The flat and/or smooth upper surface of the device precursor shown in FIG. 3F makes the device precursor highly suitable for additional processing. In particular, starting component with fabrication with a smooth and continuous upper surface permits more complex structures to be built on the device precursor. As an example of additional processing, the waveguide 24, the waveguide taper 62, and other components can be readily formed on the device precursor of FIG. 3F. For instance, a third mask 90 can be patterned on the device precursor of FIG. 3F so as to provide the device precursor of FIG. 3G. The third mask 90 is patterned so as to protect the regions of the light-transmitting medium 42 where the ridge of the waveguide 24 and the waveguide taper 62 will be formed while leaving the adjacent regions of the light-transmitting medium 42 exposed. For instance, the third mask 90 includes trench openings 92 that extend through the third mask 90 so as to expose the light-transmitting medium 42 under the trench openings. Suitable materials for the third mask 90 include, but are not limited to, polymers, photoresists, silica, SiN, silicon, and oxynitride. Suitable methods for patterning the second mask 80 include, but are not limited to, wet chemical etches and plasma dry etches.

The light-transmitting medium 42 that is exposed in the trench openings 92 can be removed so as to define a ridge of a waveguide 24 and the waveguide taper 62. For instance, a third etch can be performed on the device precursor of FIG. 3G and the remaining portions of the second mask 80 removed so as to form the optical device of FIG. 3H. As is evident from FIG. 3H, the third etch forms the trenches 46 that define the waveguide 24 and the waveguide taper 62 on waveguide layer 40. As a result, the third etch can be performed for a duration that is sufficient to provide the ridge of the waveguide and the waveguide taper 62 with the desired height. A suitable third etch includes, but is not limited to, wet chemical etches and plasma dry etches.

Figure 3I:
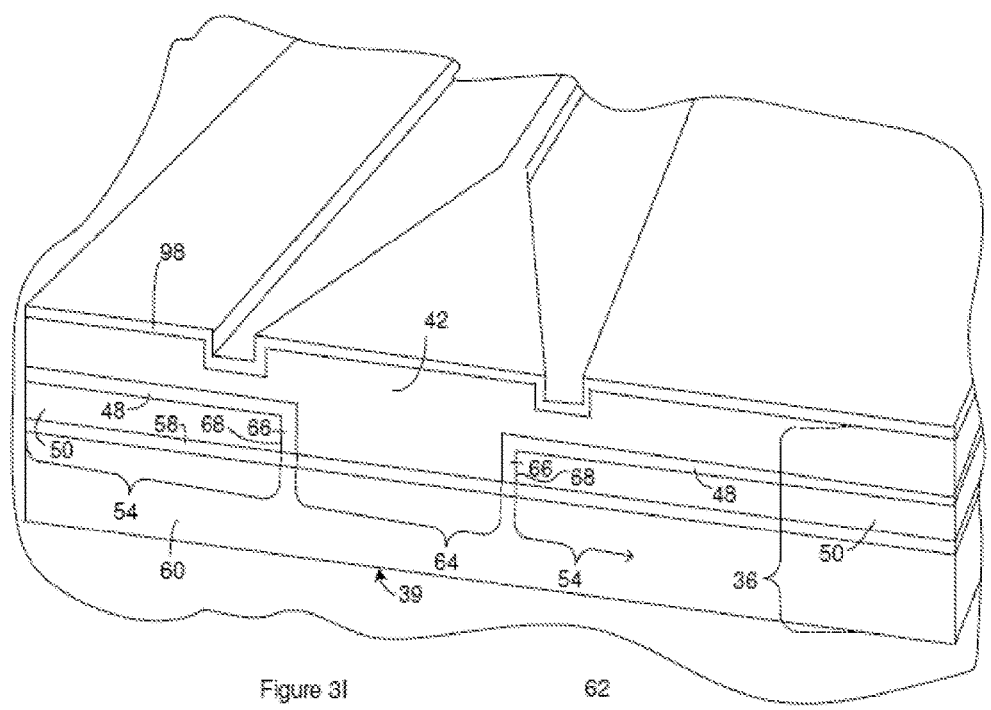

As described above one or more claddings cladding layers (not shown) can optionally be positioned on and/or over the light-transmitting medium 42. For instance, FIG. 3I illustrates a waveguide cladding 98 formed on and/or over the light-transmitting medium 42 of FIG. 3H. As is evident from FIG. 3I, the one or more cladding layers need not contact the lower waveguide cladding 48, the lower taper claddings 58, and/or the lateral cladding 66. For instance, the light-transmitting medium 42 can be between the waveguide optical cladding 98 and the lower waveguide cladding 48, the lower taper claddings 58, and/or the lateral cladding 66. At least one of the one or more claddings cladding layers can contact the light-transmitting medium 42 or other materials (not illustrated) can be optionally be positioned between all or a portion of the one or more claddings cladding layers and the light-transmitting medium 42. At least the one or more claddings cladding layers closest to the light-transmitting medium 42 or contacting the light-transmitting medium 42 can have a lower index of refraction than the light-transmitting medium 42. Suitable materials for the one or more claddings cladding layers include, but are not limited to, silica, SiN, and silicon oxynitride. Suitable materials for forming the one or more claddings cladding layers on the device precursor include, but are not limited to, silica, SiN, and silicon oxynitride.

Although the above taper is shown with two taper structures, the above method can be used to generate tapers with more than two taper structures.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of forming an optical device, comprising:
   forming a cladding trench in a first light-transmitting medium that is included on a wafer;
   forming a lateral cladding in the cladding trench such that the lateral cladding becomes an optical cladding on a lateral side of a first tapered portion of a waveguide;
   forming a second light-transmitting medium on the wafer such that a portion of the first light-transmitting medium is between a bottom of the cladding trench and the second light-transmitting medium; and
   patterning the second light-transmitting medium so as to define a second tapered portion of the waveguide over the first tapered portion of the waveguide.

2. The method of claim 1, wherein patterning the second light-transmitting medium includes defining an untapered portion of the waveguide in the second light-transmitting medium.

3. The method of claim 1, wherein forming a second light-transmitting medium on the wafer includes growing the second light-transmitting medium on a portion of the first light-transmitting medium located between the bottom of the trench and a surface of the first light-transmitting medium.

4. The method of claim 1, wherein forming the cladding trench includes etching from a first side of the first light-transmitting medium toward a second side of the first light-transmitting medium and stopping before reaching the second side of the first light-transmitting medium.

5. The method of claim 1, wherein the first light-transmitting medium and the second light-transmitting medium are both silicon.

6. The method of claim 1, wherein forming the lateral cladding in the cladding trench includes forming a lower taper cladding such that the first tapered portion is between the lateral cladding and the second tapered portion.

7. The method of claim 1, wherein the wafer includes one or more sacrificial layers at the time the cladding trench is formed and the cladding trench is formed with a portion of the first light-transmitting medium between the bottom of the trench and the one or more sacrificial layers.

8. The method of claim 7, wherein a second wafer is bonded to the wafer such that the first light-transmitting medium is between the second wafer and the one or more sacrificial layers.

9. The method of claim 8, wherein at least one of the sacrificial layers is removed before the second light-transmitting medium is formed on the wafer.

10. A method of forming an optical device, comprising:
    forming a lateral cladding on a lateral side of a first tapered portion of a waveguide that is included on a first wafer;
    forming a lower waveguide cladding on a bottom of the first tapered portion, the lower waveguide cladding being formed concurrently with or after the lateral cladding is formed; and
    forming a second tapered portion of the waveguide such that the first tapered portion is between the lower waveguide cladding and the second tapered portion,
      the second tapered portion is stacked on the first tapered portion such that the first tapered portion and the second tapered portion are included in a waveguide taper,
      the second tapered portion being formed after the lower waveguide cladding is formed.

11. The method of claim 10, wherein the lower waveguide cladding is positioned between different portions of the lateral cladding.

12. The method of claim 11, wherein the lower waveguide contacts the different portions of the lateral cladding.

13. The method of claim 10, wherein the lower cladding and the lateral cladding are each formed by thermal oxidation.

14. The method of claim 10, wherein the wafer includes one or more sacrificial layers before the lateral cladding is formed and a second wafer is bonded to the wafer with the lateral cladding being between the second wafer and the one or more sacrificial layers.

15. The method of claim 10, wherein the second tapered portion of the waveguide guides a light signal through a light-transmitting medium and the light-transmitting medium is formed over the first tapered portion of the waveguide after at least one of the sacrificial layers is removed.

16. The method of claim 15, wherein the light-transmitting medium is grown on the first tapered portion of the waveguide.

17. The method of claim 16, wherein fabricating the optical device includes patterning the second light-transmitting medium so as to define the second tapered portion of the waveguide over the first tapered portion of the waveguide.

18. The method of claim 17, wherein patterning the light-transmitting medium includes defining an untapered portion of the waveguide in the light-transmitting medium.

* * * * *